(12) United States Patent
Johnson

(10) Patent No.: US 11,609,147 B2
(45) Date of Patent: *Mar. 21, 2023

(54) DUCT LEAKAGE DETECTION SYSTEM AND METHOD

(71) Applicant: John Johnson, Westerville, OH (US)

(72) Inventor: John Johnson, Westerville, OH (US)

(*) Notice: Subject to any disclaimer, the term of this patent is extended or adjusted under 35 U.S.C. 154(b) by 32 days.

This patent is subject to a terminal disclaimer.

(21) Appl. No.: 17/343,422

(22) Filed: Jun. 9, 2021

(65) Prior Publication Data

US 2021/0293655 A1 Sep. 23, 2021

Related U.S. Application Data

(63) Continuation of application No. 16/040,022, filed on Jul. 19, 2018, now Pat. No. 11,041,780.

(60) Provisional application No. 62/534,471, filed on Jul. 19, 2017.

(51) Int. Cl.
| | |
|---|---|
| *G01M 3/38* | (2006.01) |
| *F24F 7/04* | (2006.01) |
| *F24F 13/02* | (2006.01) |
| *G01M 3/00* | (2006.01) |
| *F24F 11/36* | (2018.01) |

(52) U.S. Cl.
CPC ............ *G01M 3/38* (2013.01); *F24F 7/04* (2013.01); *F24F 13/02* (2013.01); *G01M 3/007* (2013.01); *F24F 11/36* (2018.01)

(58) Field of Classification Search
CPC ........ G01M 3/38; F21V 21/145; F21V 21/32; F21V 21/0965; F21V 7/0075
See application file for complete search history.

(56) References Cited

U.S. PATENT DOCUMENTS

| | | | | |
|---|---|---|---|---|
| 3,885,091 A | * | 5/1975 | Fish ..................... | G01M 3/38 348/84 |
| 4,739,457 A | * | 4/1988 | Orr ...................... | F21L 15/14 362/306 |
| 7,305,176 B1 | | 12/2007 | Pieroni | |
| 8,418,530 B1 | | 4/2013 | Scaringe et al. | |
| 8,651,688 B1 | * | 2/2014 | Golden ................. | F21L 4/00 362/208 |
| 9,035,270 B2 | * | 5/2015 | Graebel ................ | F24F 13/02 250/455.11 |
| 2013/0176715 A1 | * | 7/2013 | Rubino ................. | F21V 17/105 362/323 |

(Continued)

FOREIGN PATENT DOCUMENTS

| | | |
|---|---|---|
| DE | 2913918 | 10/1980 |
| DE | 3013465 A1 * | 10/1980 |

(Continued)

OTHER PUBLICATIONS

"Fluke RLD2 Leak Detector Flashlight Technical Data Sheet", Fluke Corporation. Retrieved from: https://dam-assets.fluke.com/s3fs-public/3471674_0000_ENG_A_W.PDF.

*Primary Examiner* — Nathaniel J Kolb
(74) *Attorney, Agent, or Firm* — Dinsmore & Shohl, LLP; James J. Pingor

(57) ABSTRACT

Systems and methodologies are disclosed to detect a leak in a duct system or other closed loop systems. The system and methodologies use a light source to detect a leak in a duct system, e.g., the ductwork of a HVAC/R system.

17 Claims, 17 Drawing Sheets

(56) References Cited

U.S. PATENT DOCUMENTS

2014/0252248 A1\* 9/2014 Graebel .................... F24F 7/04
　　　　　　　　　　　　　　　　　　　　　　　250/504 R

FOREIGN PATENT DOCUMENTS

DE　　　2913918 A1 \* 10/1981
DE　　　3013465　　 10/1981

\* cited by examiner

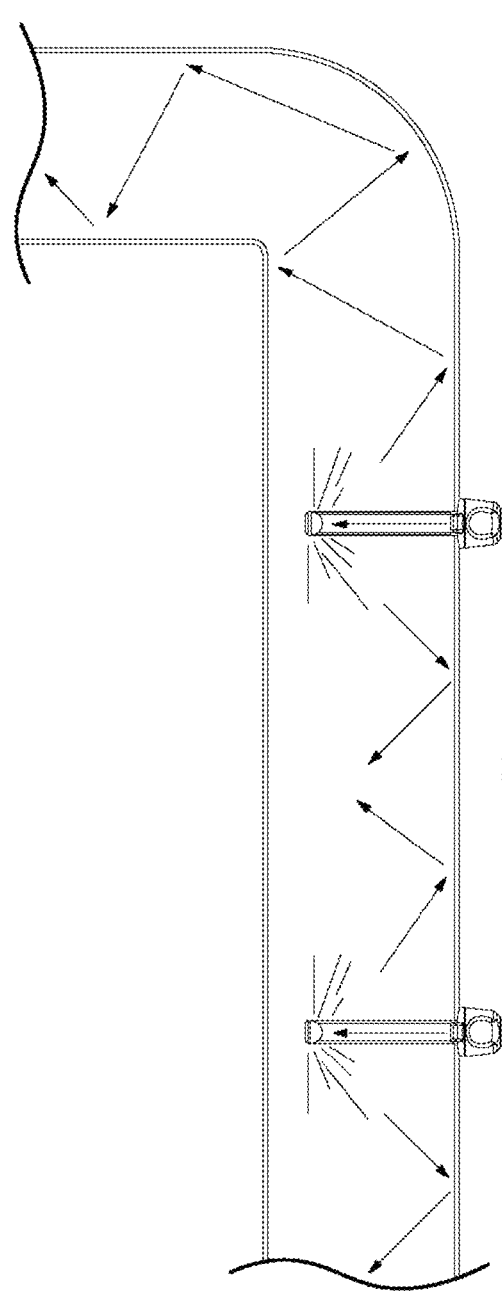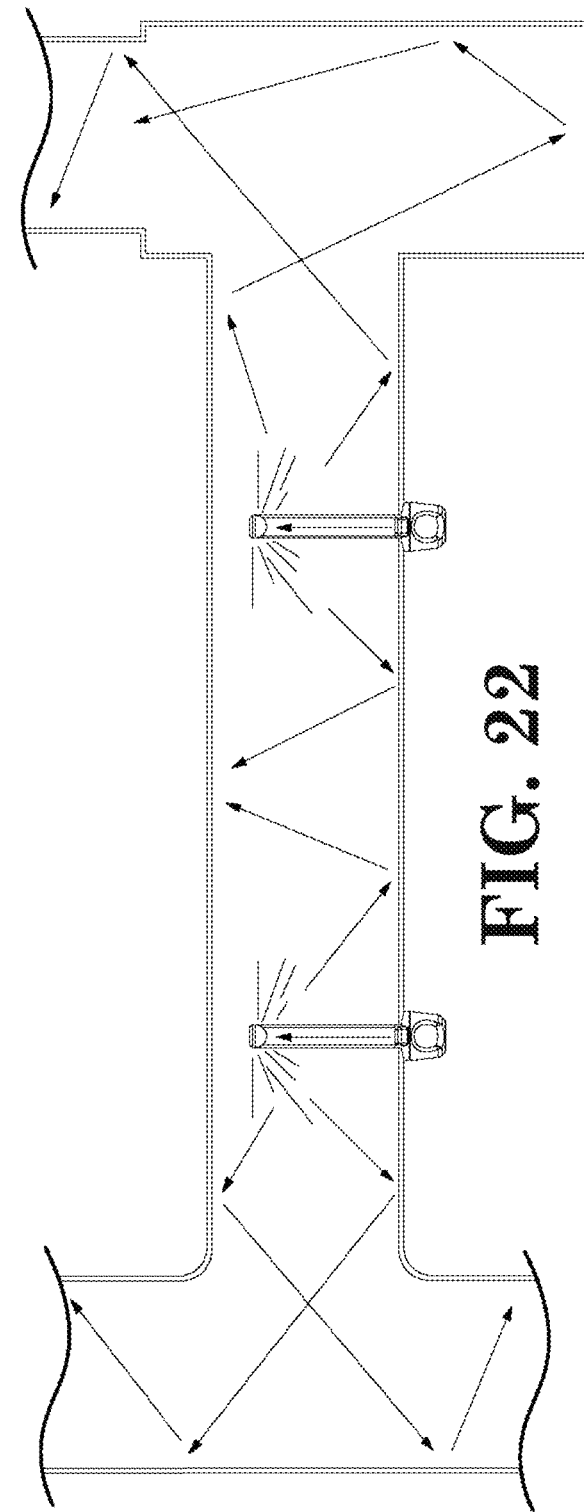

DUCT LEAKAGE DETECTION SYSTEM AND METHOD

CROSS-REFERENCE TO RELATED APPLICATIONS

This application is a continuation of U.S. patent application Ser. No. 16/040,022 entitled "DUCT LEAKAGE DETECTION SYSTEM AND METHOD" filed on Jul. 19, 2018 and claims the benefit of U.S. Provisional Patent Application Ser. No. 62/534,471 entitled "DUCT LEAKAGE DETECTION SYSTEM AND METHOD" filed Jul. 19, 2017, each of which is herein incorporated by reference in its entirety.

ORIGIN

The innovation disclosed herein relates generally to a system and method for detecting leaks in duct systems and more particularly to detecting leaks in HVAC/R systems.

BACKGROUND

Duct systems used for heating, ventilation, air conditioning and refrigeration systems (HVAC/R) lose efficiency and can be dangerous (e.g., carbon monoxide build up due to a leak in a furnace) when there are leaks in the ductwork. Detecting leaks in HVAC/R components can be difficult to locate or are not accessible without disassembling all or part of the HVAC/R system. Leaks in other closed loop systems (e.g., plumbing) are similarly difficult to locate.

Several methods are known to detect leaks in HVAC/R systems or other closed systems. The methods include visual and electronic methods. Visual methods include introducing a substance, such as smoke or vaporized dye into the system and identifying a leak where the substance escapes the system. Another method includes applying a soap solution to the joint or surface where a leak is suspected, and observing for bubble formation caused by the pressure differential between the two regions. These methods require the technician to first identify and then have access to the area of a suspected leak and require that a significant pressure differential exists between the two regions where a leak is suspected.

Other methods include the use of sensors that detect changes in the concentration of compounds (e.g., refrigerant gas) by sensing the voltage applied to electrodes distributed throughout the duct system. These methods require expensive equipment and complicated installation.

Thus, there remains a need for a simple, inexpensive means for identifying leaks in HVAC/R systems and other closed systems.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, systems and methodologies are disclosed that. According to an aspect of the innovation, a system is provided comprising a handle, a securing means, a light source, a reflector, and a power source, wherein the system may be used to detect a leak in a duct system (e.g., in an HVAC/R system or other closed loop system).

The system may include a means for securing a lighting source to the duct system. Suitable means for securing the lighting source include, but are not limited to a magnet, a gasket, or other fitting that may be used to secure the light source to the duct system. In one embodiment, the system includes a magnet for securing to a metal duct system.

In one embodiment, the system further includes a light source that may be configured to reflect light at a desired angle. In one embodiment, the system includes a cone-shaped reflector that may be used to reflect a beam of light. The reflective article may be made from most any suitable material including, but not limited to glass or plastic. In one embodiment, the reflective article may include a coating, such as a metal coating. In one example, the cone-shaped article may be made from glass. In one example, the metal coating may be an aluminum coating.

In one embodiment, the light source is an incandescent bulb or a light emitting diode (LED) (i.e., a solid state bulb).

In one embodiment, the reflector is secured to the securing means. In an example, the reflector is secured to the securing means via any suitable means including, but not limited to, carbon fibers glass fibers, structural supports comprising metal or plastic, or a combination thereof.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 21 is a diagram depicting a use of an embodiment according to the innovation.

FIG. 22 is a diagram depicting a use of an embodiment according to the innovation.

DETAILED DESCRIPTION

Figure 1:
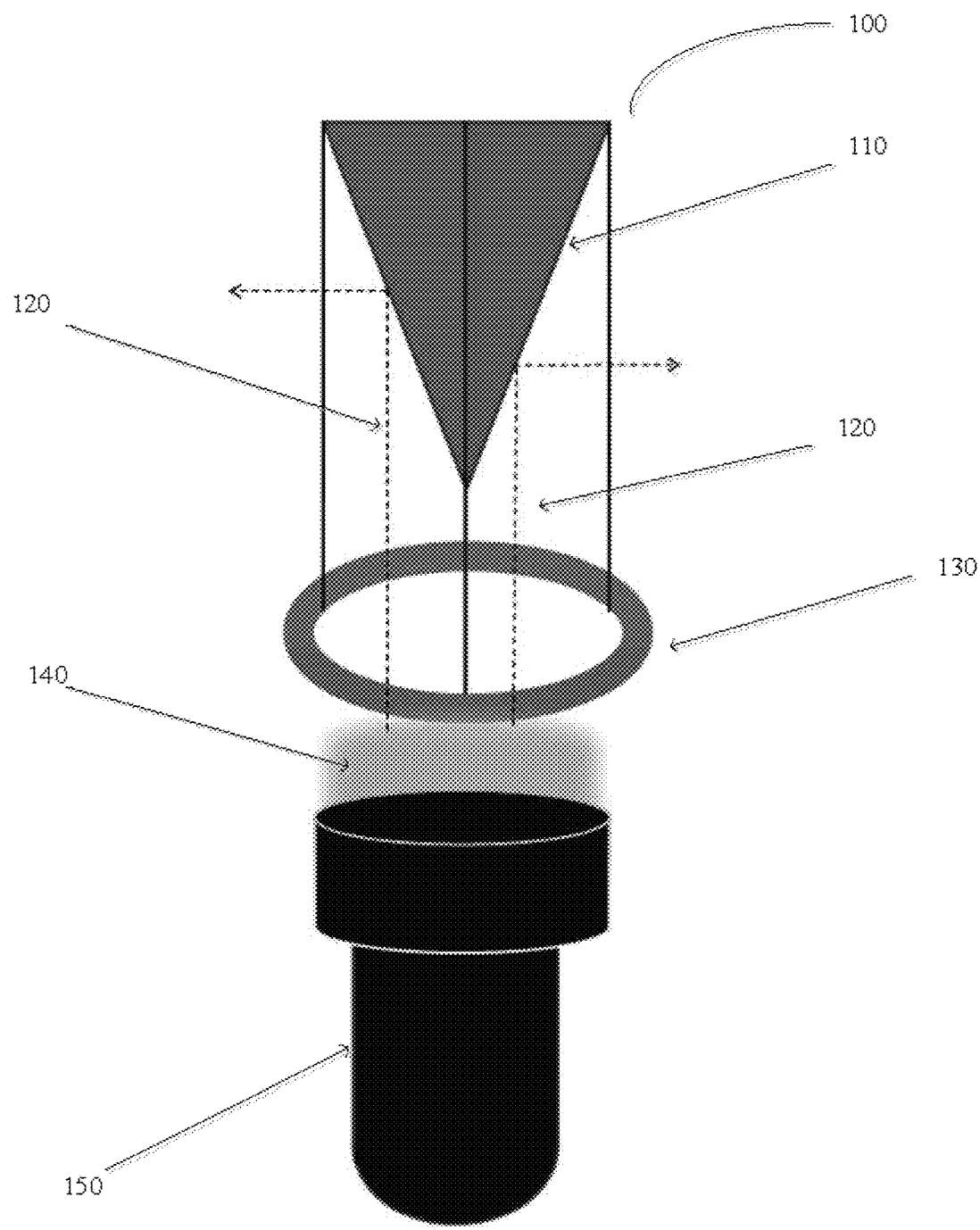
FIG. 1 is an exploded view of an illustration of an embodiment of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While, for purposes of simplicity of explanation, the one or more methodologies shown herein are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

According to an aspect of the innovation, a system is provided comprising a handle, a securing means, a light source, a reflector, and a power source, wherein the system may be used to detect a leak in a duct system (e.g., in an HVAC/R system or other closed loop system).

In one embodiment, the handle may house the lighting source and the power source.

The system may include a means for securing a lighting source to the duct system. Suitable means for securing the lighting source include, but are not limited to a magnet, a gasket, or other fitting that may be used to secure the light source to the duct system. In one embodiment, the system includes a magnet for securing the system to a metal duct system.

In one embodiment, the system further includes a light source that may be configured to reflect light at a desired angle. In one embodiment, the system includes a cone-shaped reflector that may be used to reflect a beam of light.

The reflector may be made from most any suitable material including, but not limited to glass or plastic. In one embodiment, the reflector article may include a coating, such as a metal coating. In one example, the cone-shaped article may be made from glass. In one example, the metal coating may be an aluminum coating.

In one embodiment, the light emitting source is a light source such as an incandescent bulb or a light emitting diode (LED) (i.e., a solid state bulb).

In one embodiment, the reflector is secured to the securing means. In an example, the reflector is secured to the securing means via any suitable means including, but not limited to, carbon fibers, glass fibers, structural supports comprising metal or plastic, or a combination thereof.

The majority of ducts used in air duct systems are made of sheet metal primarily made from galvanized steel. Ducts may also be fabricated from other metals including aluminum, or from other materials such as fiber glass, flexible plastic, fabric, etc.

In one embodiment, the reflector may be mounted to rotate or orbit about an axis. In one embodiment, the reflector may be connected to the leak detection system via a support that may be of variable lengths. In one embodiment, the length of the support maybe adjustable to accommodate use in various sizes of ductwork.

In one embodiment, the leak detection system may not include a light emitting source. Instead, the leak detections system may be configured to couple with a separate light emitting source (e.g., a flashlight). In one embodiment, the leak detection system may be configured to couple with various light emitting sources of various sizes and configurations. The ability to couple to various light emitting sources may facilitate leak detection in different configurations of ductwork. For example, if the base/housing or other light emitting source is narrow, it would be easier to use the leak detection system in hard to reach places along the ductwork.

The system may include a power source. The power source may be most any known power source and may include electrical, chemical, solar power source(s), or a combination thereof. In one embodiment, the power source is a removable battery. In one embodiment, the removable battery is rechargeable.

According to another aspect of the innovation, a method for detecting a leak in a duct system is provided. The method includes attaching a leak detection system to a duct system suspected of having a leak. The leak detection system may be secured to at least one duct via a securing component. In one embodiment, the securing component may comprise most any suitable material/structure for securing to the duct. In one example, the securing component is a magnet. In another embodiment, the securing component may be a gasket. The securing component may also comprise both a magnet and a gasket.

The leak detection system includes a light source and is secured to the duct such that the light emanating from the light source shines inside the duct. The light is detectable outside of the duct if a leak is present.

It will be appreciated that the disclosed systems and methodologies are not limited to ducts and will work with any closed loop system. The use of the word "duct" should be understood to mean any duct, pipe, tube, etc. that forms part of a closed loop system.

With reference now to the figures, FIG. 1 illustrates an exploded view of an example embodiment of the leak detection system in accordance with the innovation. As shown, the system 100 can include a base/handle 150. A lighting source (e.g., an incandescent bulb or an LED) may be housed inside the handle to produce light 140. A securing component 130 (e.g., a magnet or a gasket) is operatively connected to the base 150 and may be used to secure the system to ductwork. The securing component 130 may also be used to connect a reflector 110 to the base/housing 150. In one embodiment, the reflector 110 may be supported and/or connected to either the securer or the base. The reflector 110 may be used to deflect beams of light 120 in a desired direction. It is to be appreciated that the reflector may be made from any suitable material, including but not limited to glass, plastic, or the like.

Figure 2:
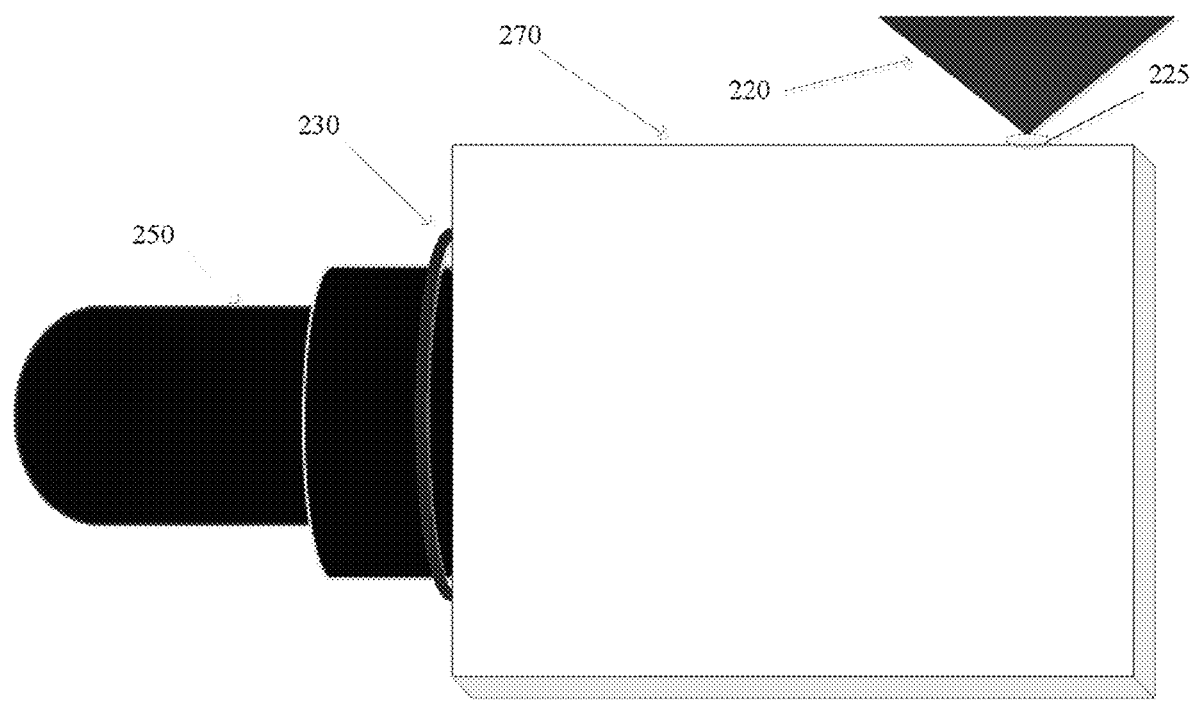
FIG. 2 is an illustration of an embodiment of the innovation in use.

FIG. 2 depicts an example embodiment of the innovation in use. In this example, the system is partly inside a duct 270. According to this example, the duct 270 may be a metal duct. The base/housing 250 is secured to the duct 270 by a magnetic securer 230. The lighting source may be housed inside the handle and may be used to shine light inside the duct. In this example, the light 220 escapes the duct 270 via a leak 225. The escaped light 220 provides confirmation of the leak and identifies the location of the leak.

Figure 3:
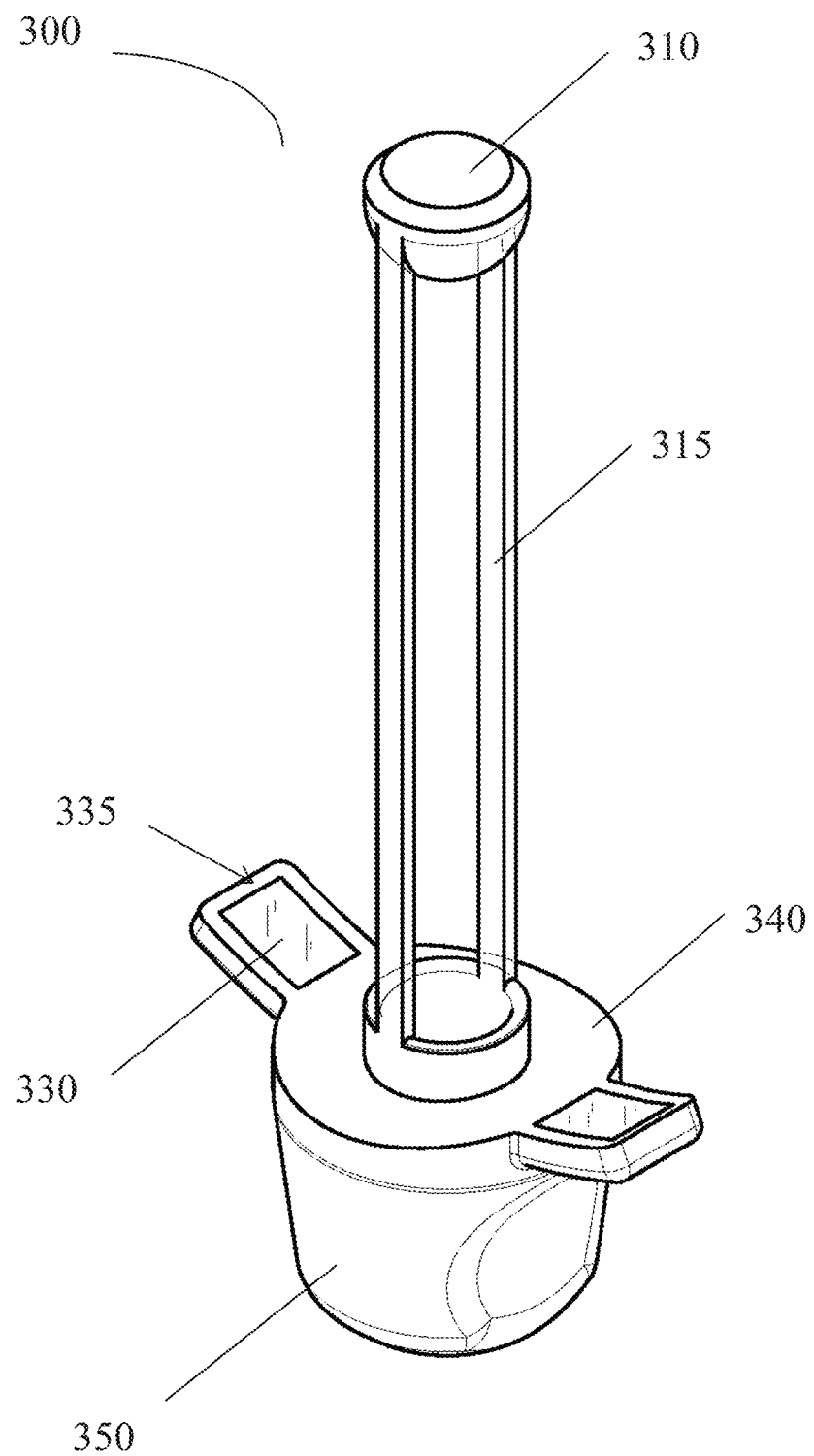
FIG. 3 is an illustration of a perspective view of an embodiment according to the innovation.
Figure 4:
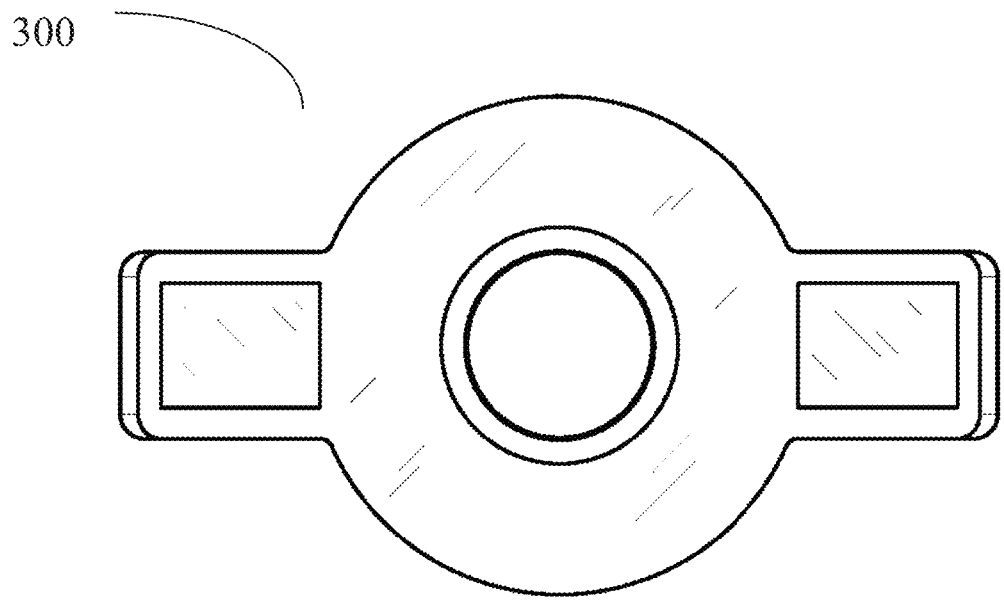
FIG. 4 is an illustration of a top view of an embodiment according to the innovation.
Figure 5:
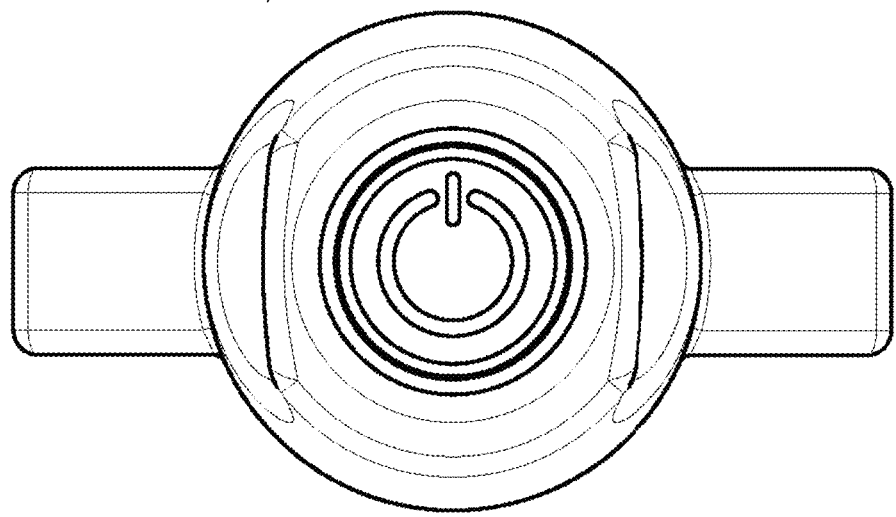
FIG. 5 is an illustration of a bottom view of an embodiment according to the innovation.
Figure 6:
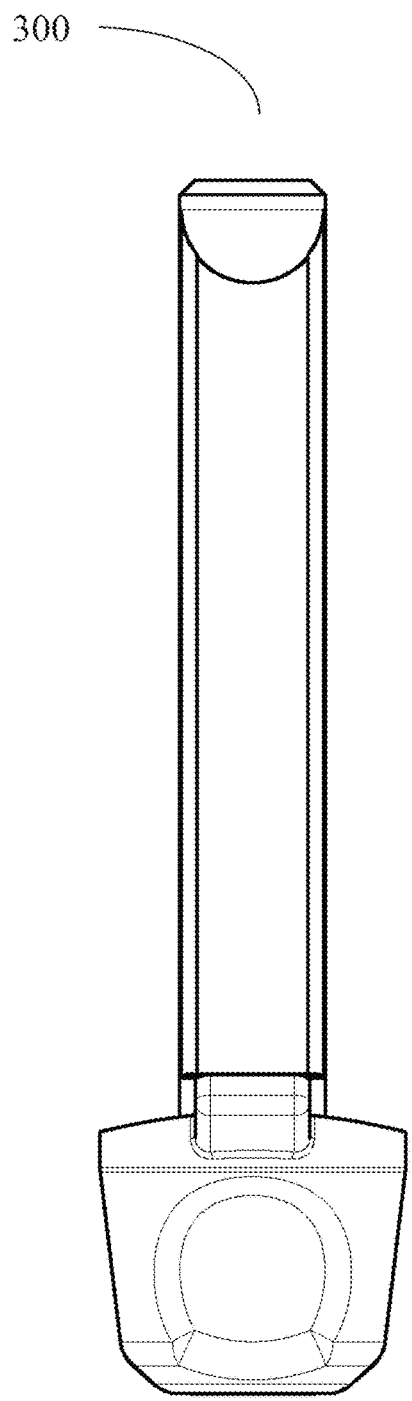
FIG. 6 is an illustration of a front view of an embodiment according to the innovation.
Figure 7:
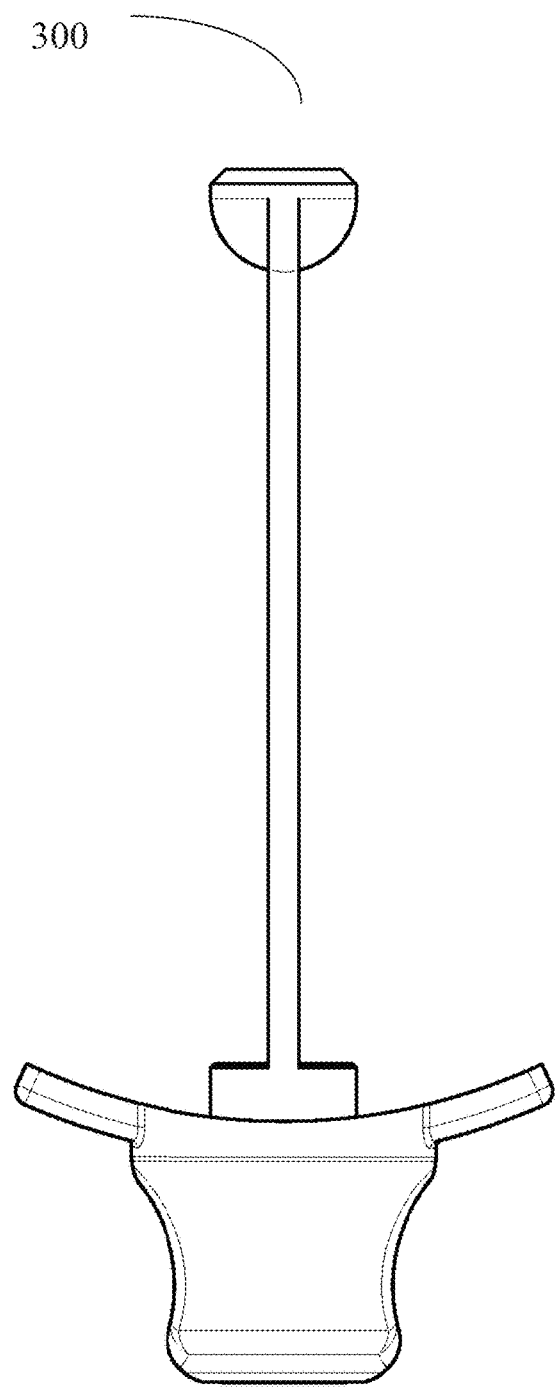
FIG. 7 is an illustration of a side view of an embodiment according to the innovation.

FIG. 3 depicts an example embodiment. The leak detection system 300 may include a base/housing 350, a securing component (e.g., a magnet, suction cup, etc.) 330, an arm 335, a reflector 310, and a support 315 that connects the reflector to the base 350. FIGS. 4-7 depict different views of an embodiment having the same general configuration as depicted in FIG. 3.

Figure 8:
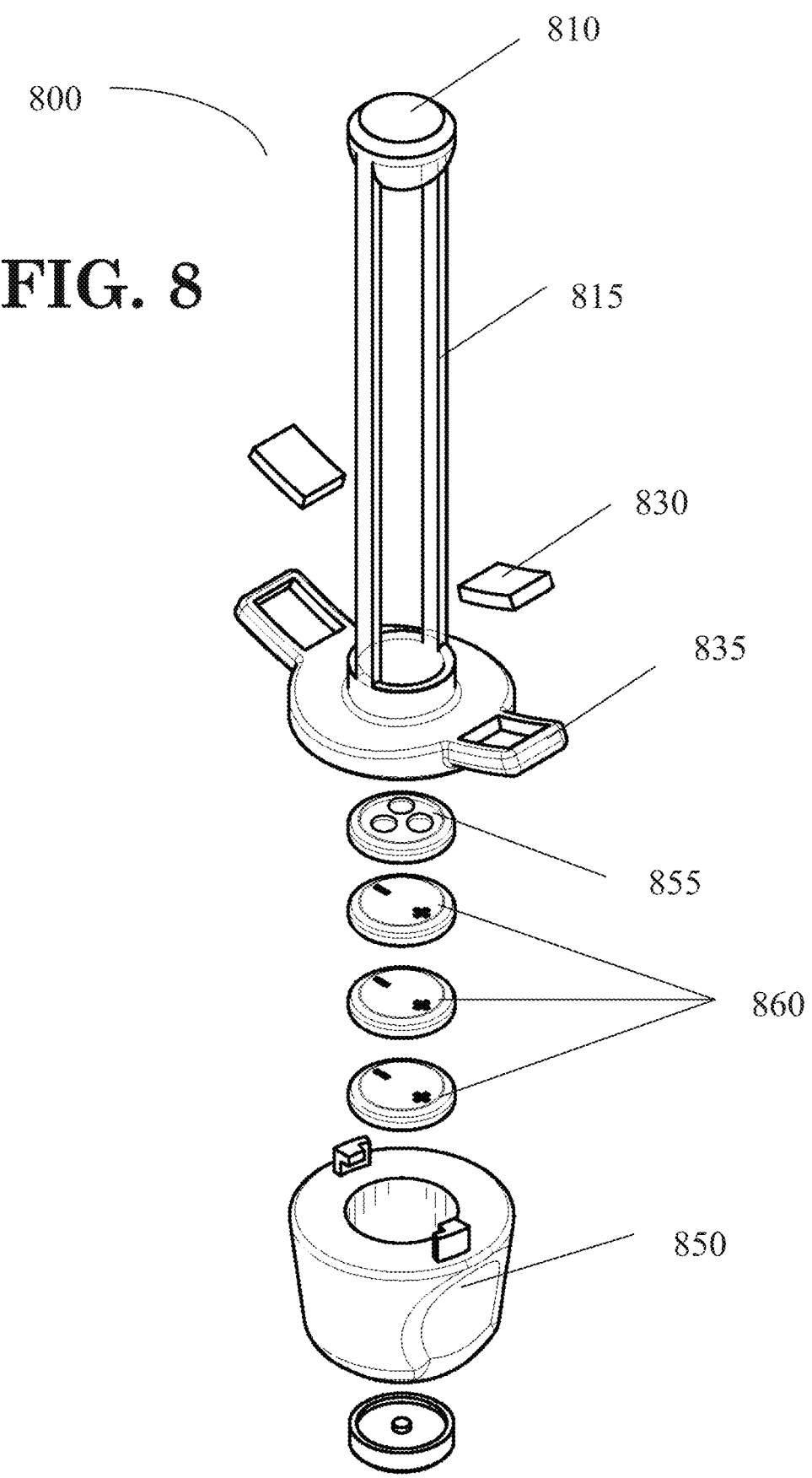
FIG. 8 is an illustration of an exploded view of an embodiment according to the innovation.

FIG. 8 depicts an exploded view of an example embodiment of a leak detection system 800 according to the innovation. In one embodiment, the leak detection system 800 may comprise a reflector 810, a support 815, a support base 840, an arm 835 that may house a securer 830, a power source (battery) 860, a light source 855, and a base/housing 850. In this embodiment, the support 815 may be connected to the housing 850 by the support base 840. The connection to the base 850 may be by most any means. In one embodiment, the support base 840 is removably connected to the base 850. In another embodiment, the support housing 840 is integrally formed with the base 850.

Figure 9:
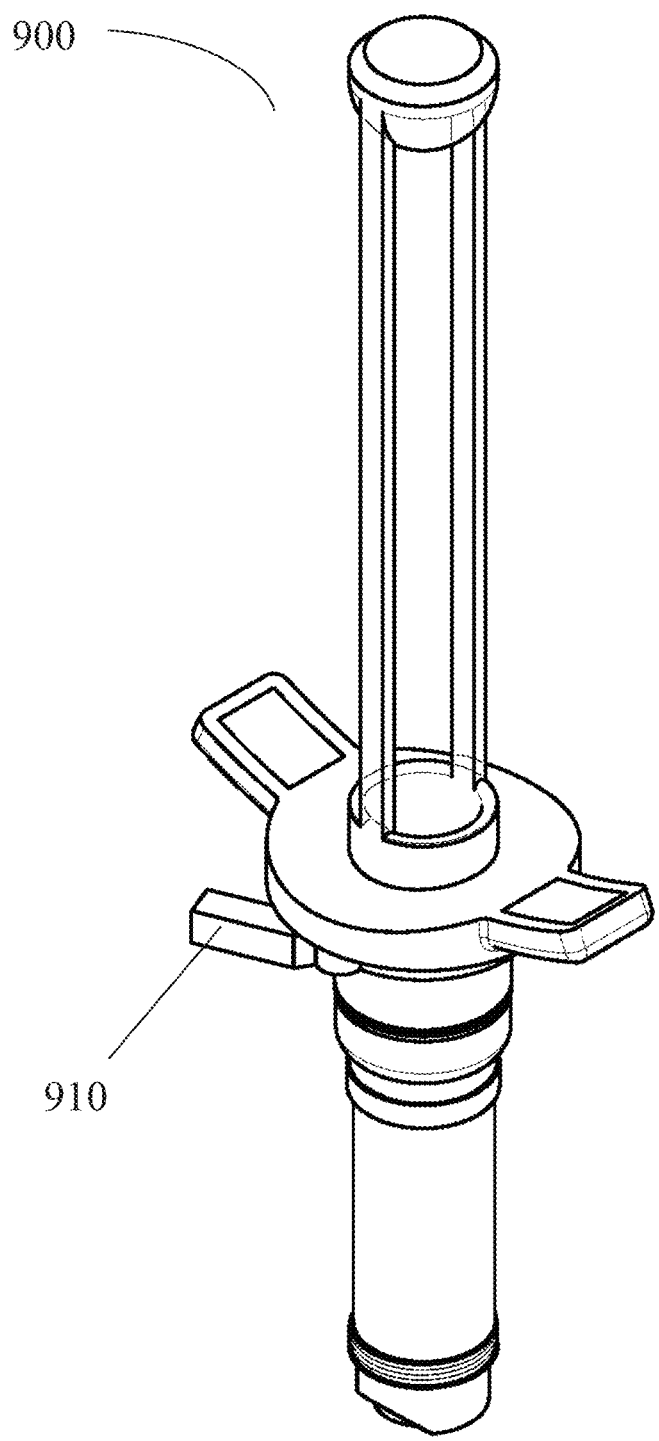
FIG. 9 is an illustration of an embodiment according to the innovation in use.
Figure 10:
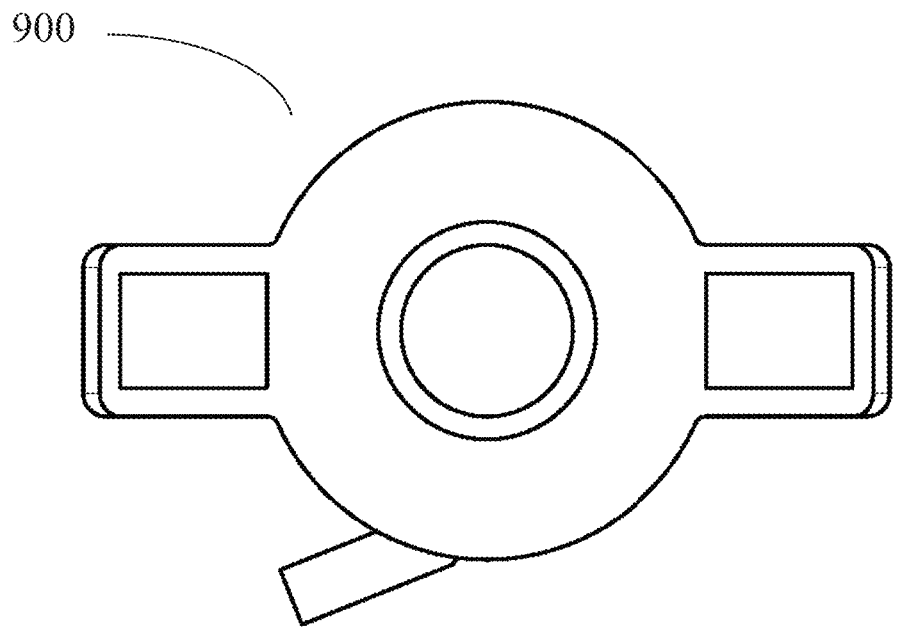
FIG. 10 is an illustration of a top view of an embodiment according to the innovation.
Figure 11:
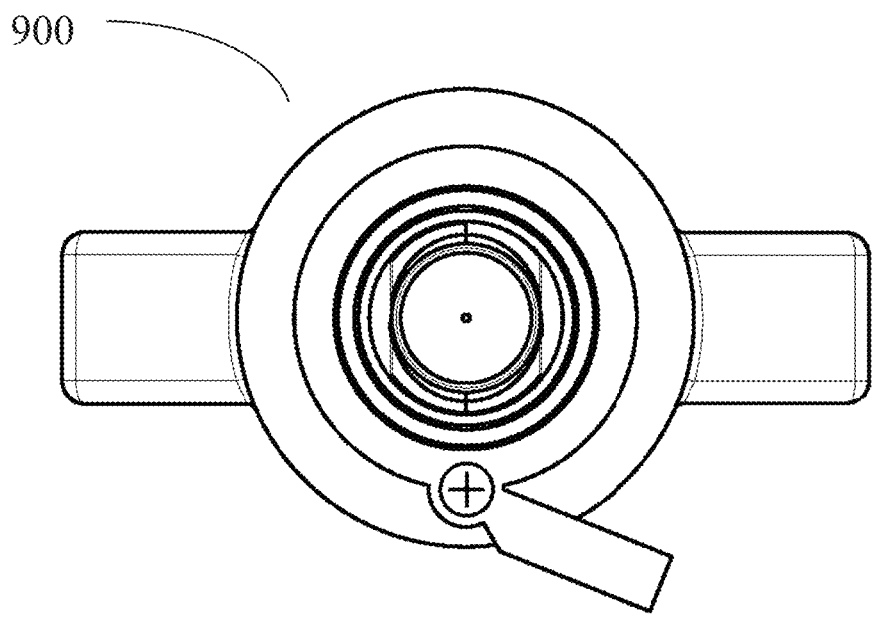
FIG. 11 is an illustration of a bottom view of an embodiment according to the innovation.
Figures 12, 13:
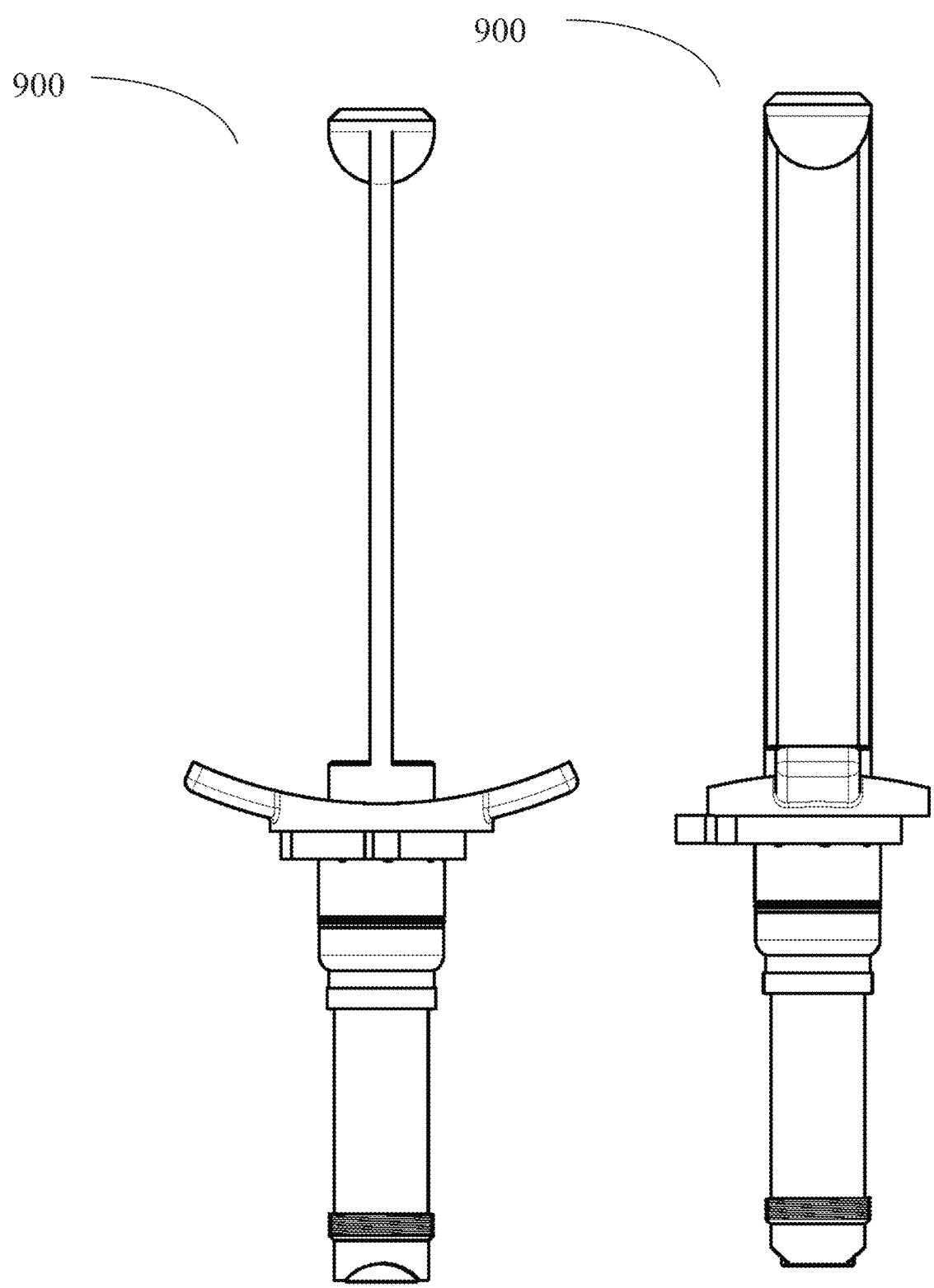
FIG. 12 is an illustration of a side view of an embodiment according to the innovation.
FIG. 13 is an illustration of a front view of an embodiment according to the innovation.

In one embodiment, an assembly according to the innovation may include a leak detection system that attaches to a light emitting source (e.g., a flashlight). FIG. 9 depicts an embodiment according to the innovation that includes a leak detection assembly 900 that attaches to a light emitting source 999. The leak detection assembly 900 may be attached to the light emitting source 999 by a clamp 910. It is to be understood that the leak detection assembly may be secured to the light emitting source 999 by most any suitable coupling, including, but not limited to, an adhesive, a deformable member (e.g., a rubber or plastic wedge, gasket, etc.), a clamp, friction fit, or any reasonable mechanical means. FIGS. 10 and 11 depict top and bottom views of an embodiment of the innovation in which the leak detection assembly includes a clamp for coupling the leak detection assembly to a light emitting source. FIGS. 12 and 13 are side views of embodiments of the innovation in which the light detecting assembly is coupled with a light emitting source.

Figure 14:
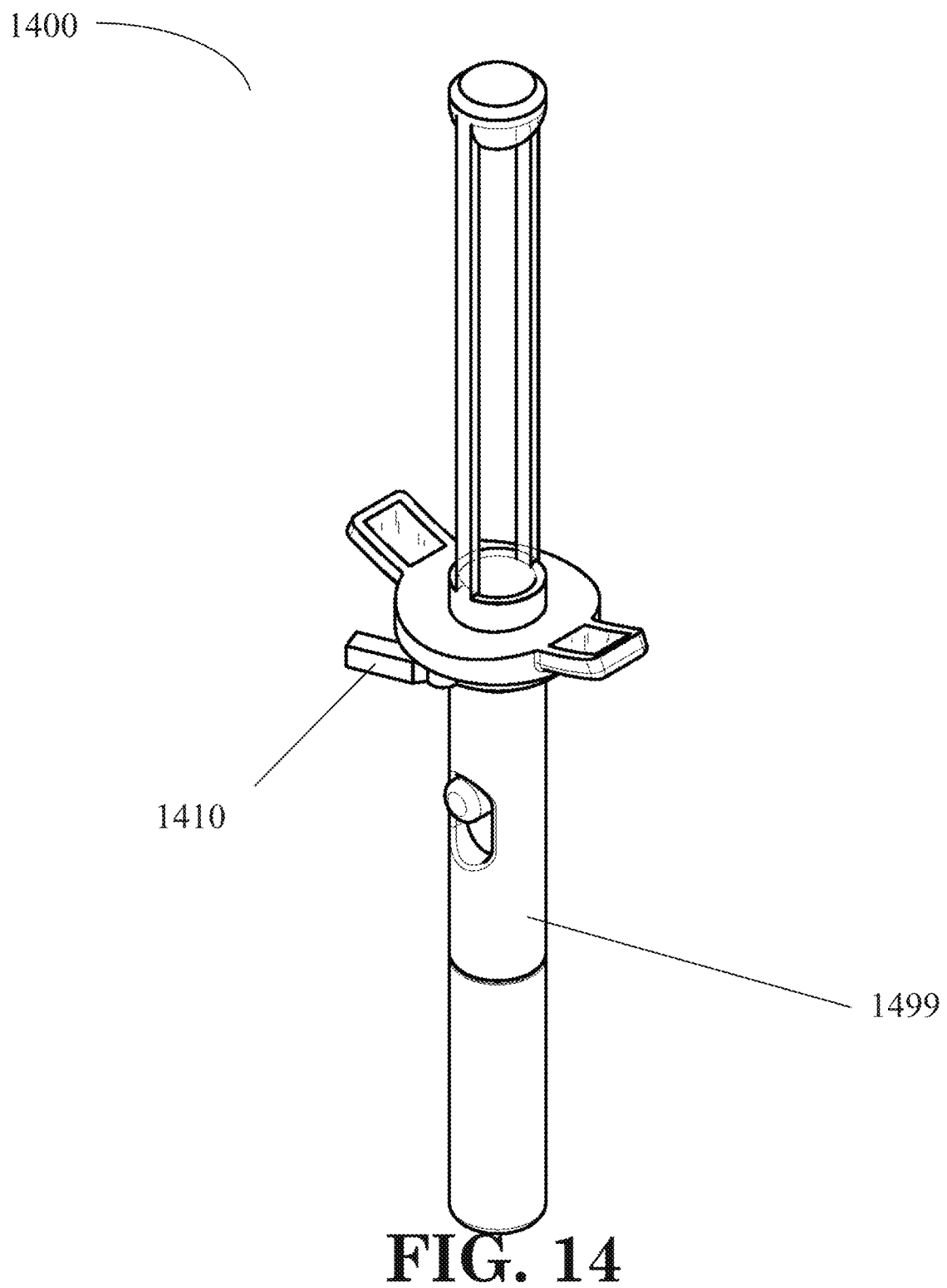
FIG. 14 is an illustration of a perspective view of an embodiment according to the innovation.
Figure 15:
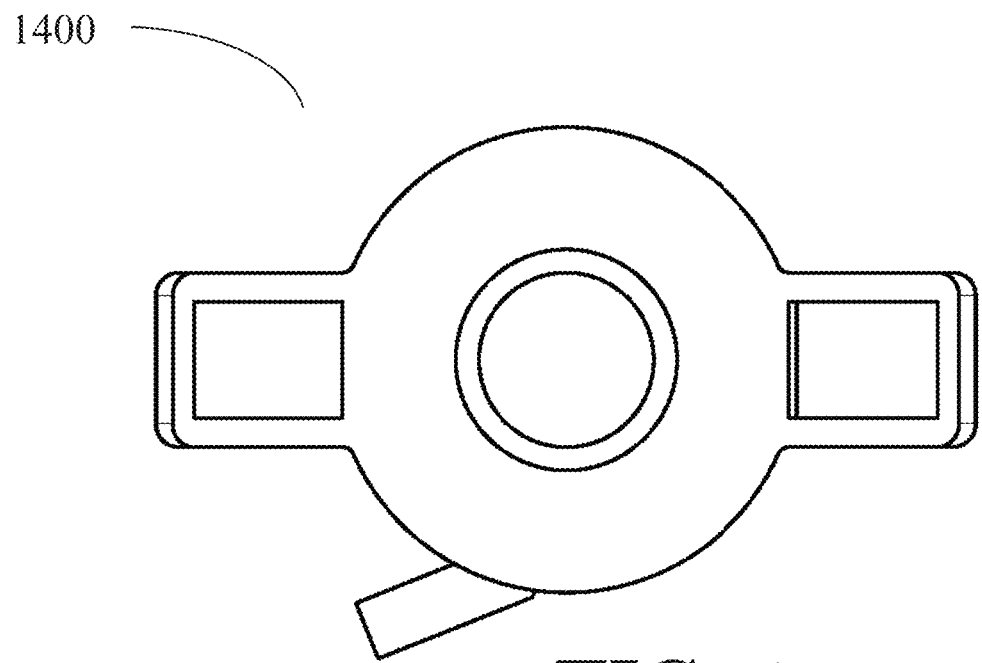
FIG. 15 is an illustration of a top view of an embodiment according to the innovation.
Figure 16:
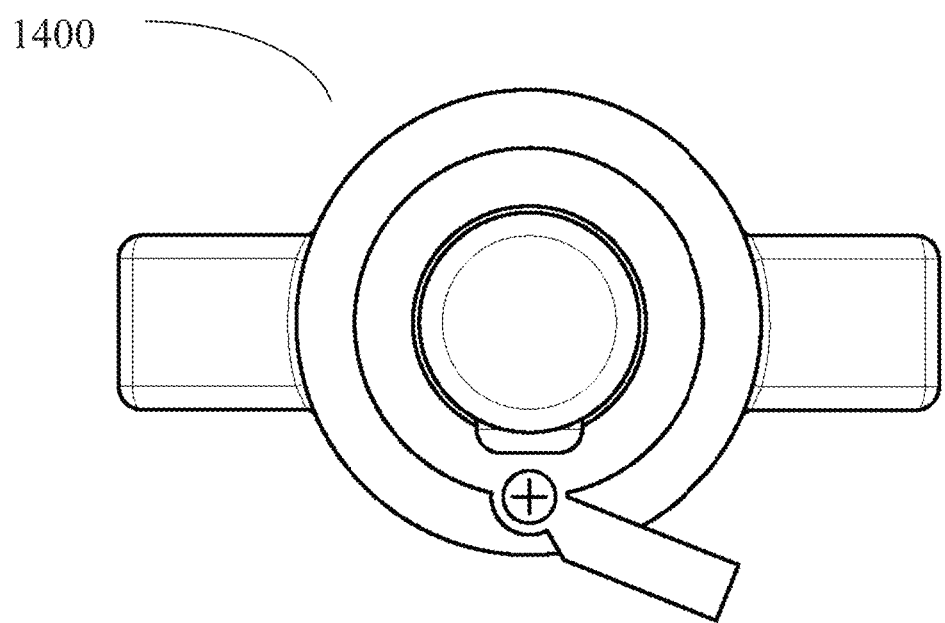
FIG. 16 is an illustration of a bottom view of an embodiment according to the innovation.
Figures 17, 18:
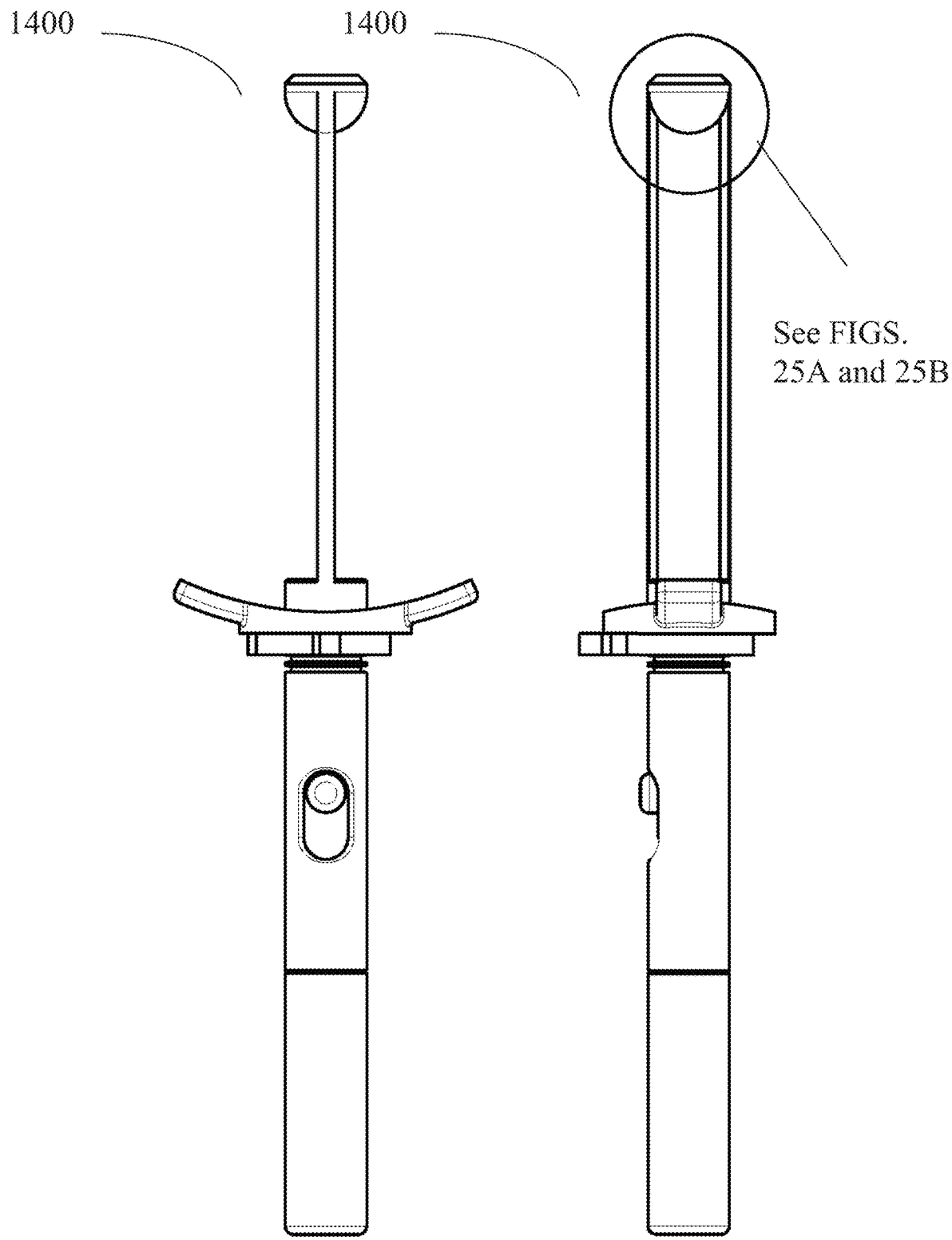
FIG. 17 is an illustration of a front view of an embodiment according to the innovation.
FIG. 18 is an illustration of a side view of an embodiment according to the innovation.

FIG. 14 depicts another embodiment in which the leak detection assembly 1400 is coupled with a light emitting source. FIGS. 15 and 16 depict top and bottom views of an embodiment of the innovation in which the leak detection assembly includes a clamp for coupling the leak detection assembly to a light emitting source. FIGS. 17 and 18 are side views of embodiments of the innovation in which the light detecting assembly is coupled with a light emitting source.

Figure 19:
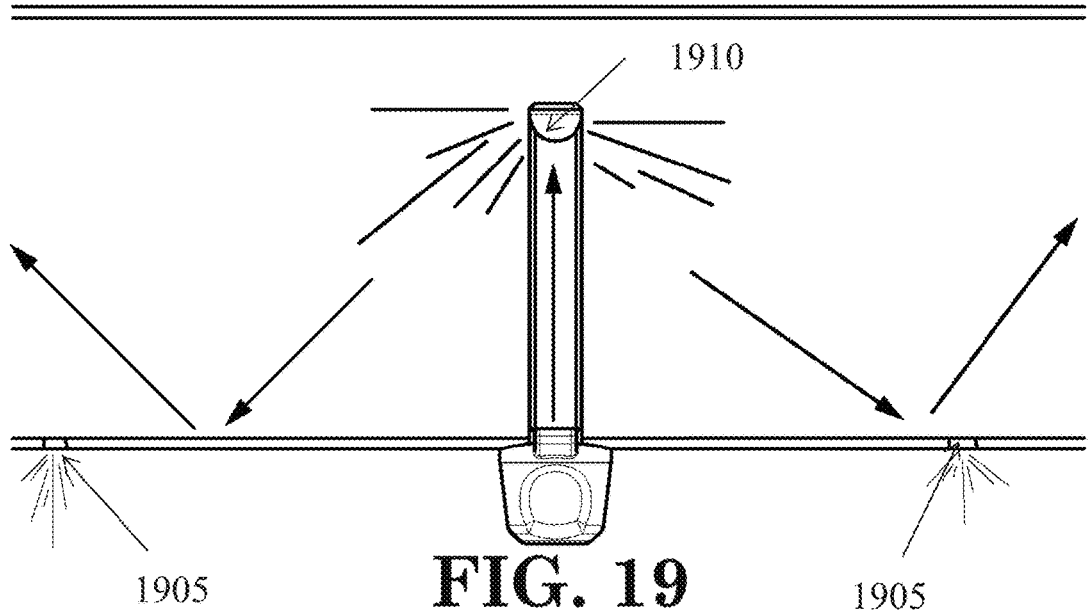
FIG. 19 is a diagram depicting a use of an embodiment according to the innovation.
Figure 20:
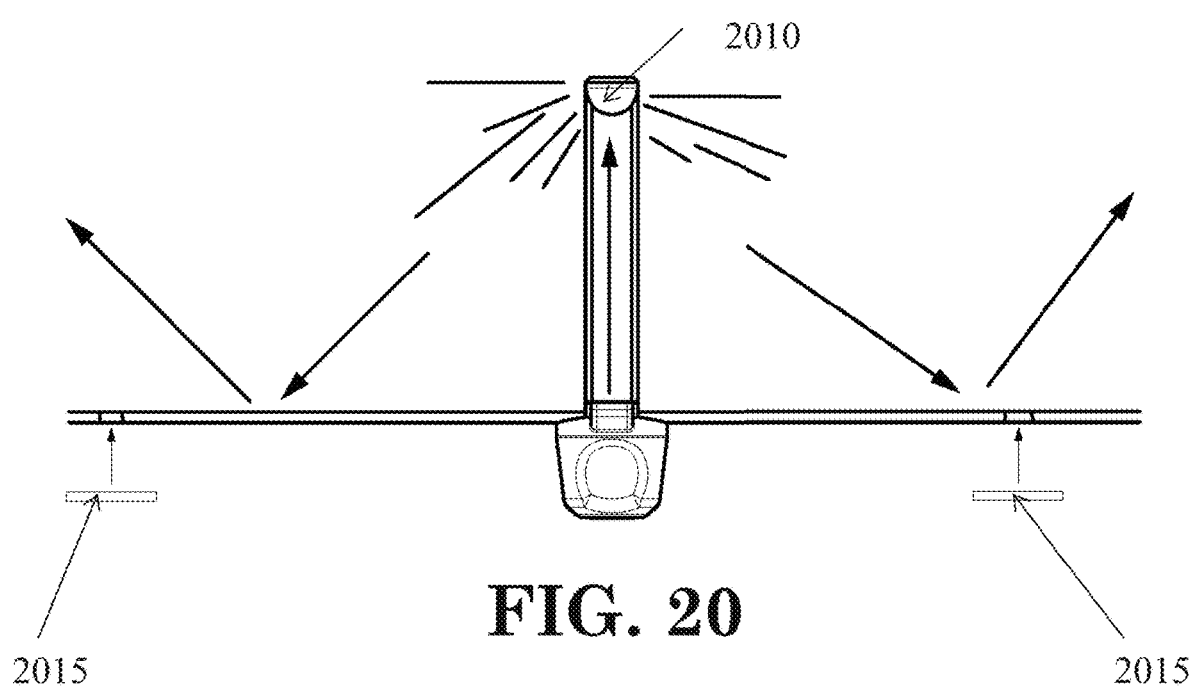
FIG. 20 is a diagram depicting a use of an embodiment according to the innovation.

FIGS. 19 and 20 are illustrations depicting use of a leak detection system within ductwork. Light from a light emitting source (e.g., LED bulb) from the base/housing or from another light emitting source (e.g., a flashlight) may be reflected by the reflector 1910 or 2010. In FIG. 19, light from the leak detection system may be reflected toward and shine through holes in the ductwork, thus, identifying a leak(s) in the ductwork. The leak(s) may be repaired with any suitable material 2015 for sealing leaks.

FIGS. 21 and 22 depict illustrations of use of embodiments of the innovation to detect a leak in ductwork. As depicted, the leak detection system may be used in multiple locations throughout different configurations of ductwork to locate a leak. Alternatively, multiple leak detections systems may be used. It will be appreciated that the leak detection system according to the innovation may be used with most any configuration of ductwork.

Figure 23:
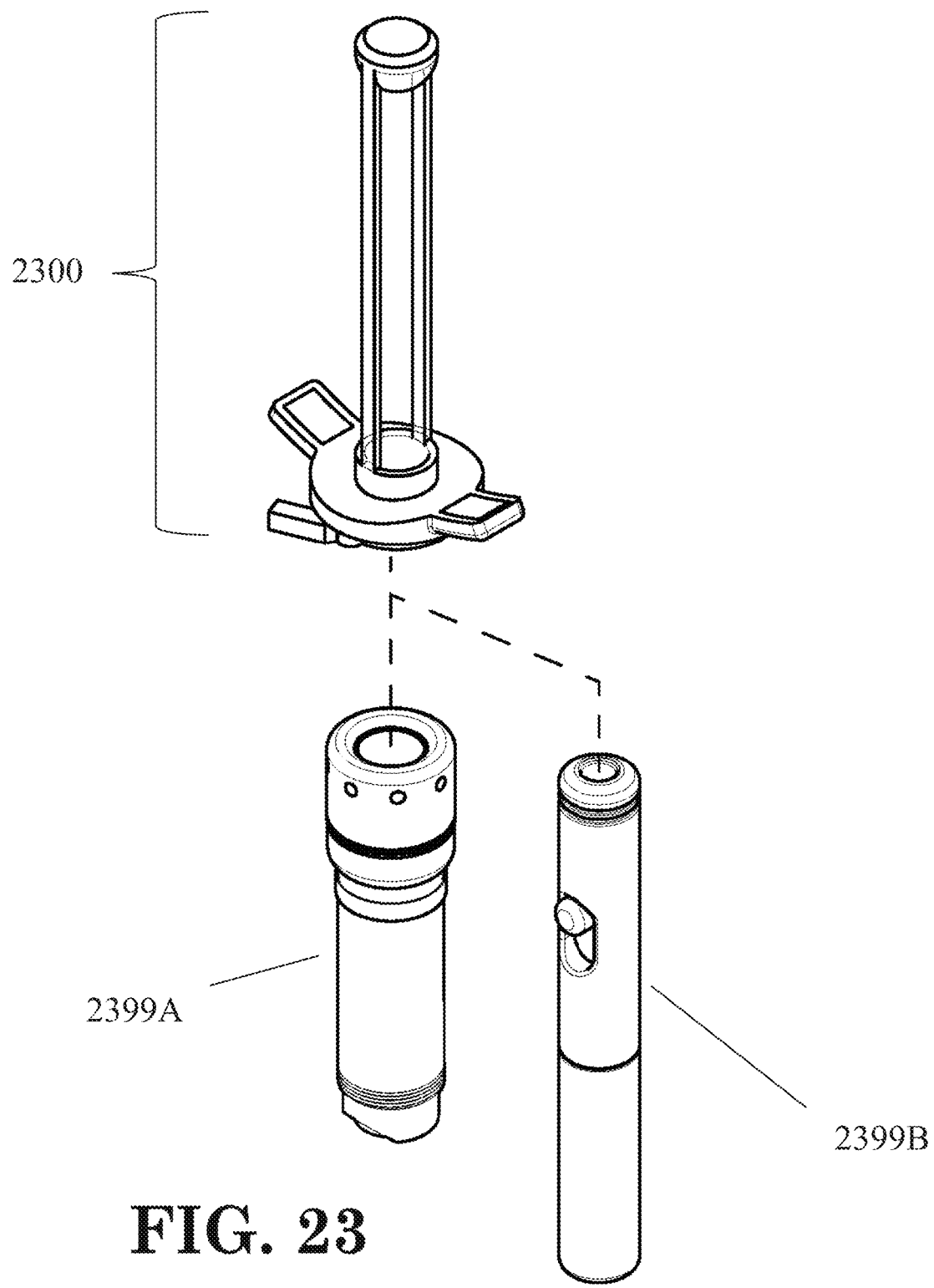
FIG. 23 is an illustration depicting the interchangeable use of an embodiment according to the innovation.
Figure 24:
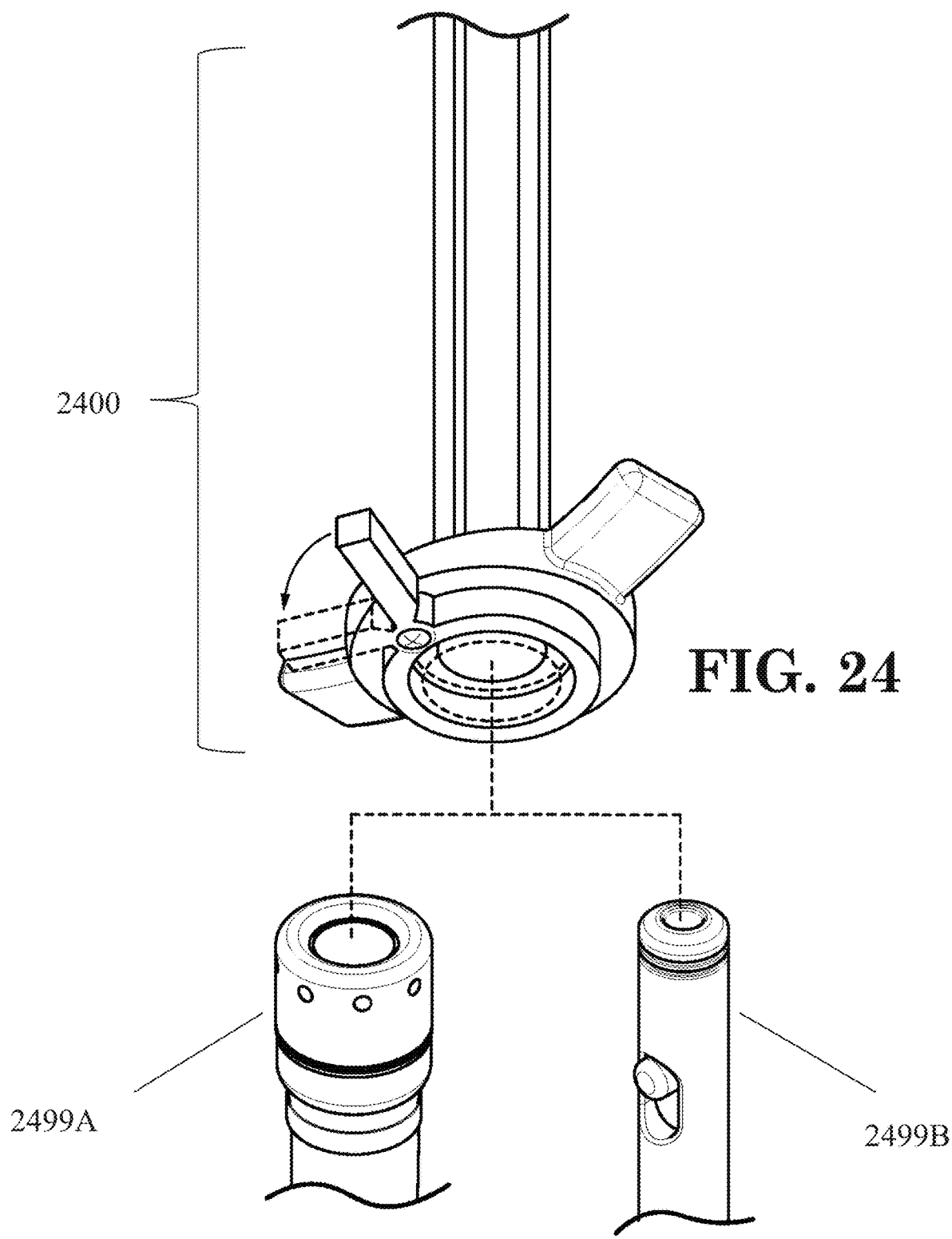
FIG. 24 is an illustration depicting an adjustable attachment mechanism for interchangeable use of an embodiment according to the innovation.
Figure 25A:
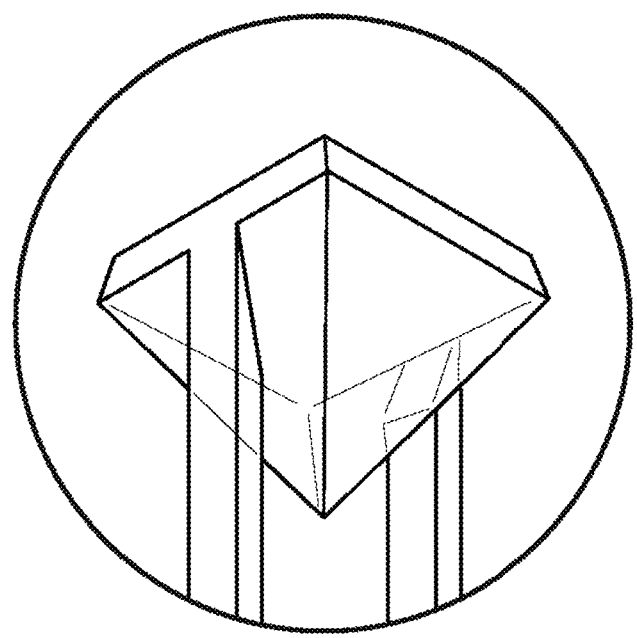
FIGS. 25A and 25B depicts illustrations of reflectors according to embodiments of the innovation.
Figure 25B:
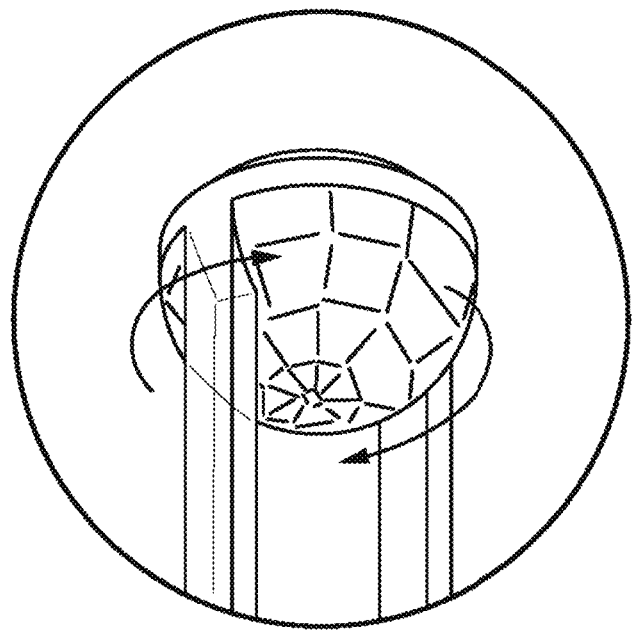

As depicted in FIG. 23, in some embodiments, the leak detection system 2300 may be configured to couple with various light emitting sources (e.g., 2399A or 2399B). The ability to change the light emitting source may facilitate use of the leak detection system in various spaces. For example, a longer or narrower light emitting source may make it easier to reach certain parts of the ductwork. FIG. 24 depicts coupling of the leak detection system 2400 with a light emitting source via a clamp 2410.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has, "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that detects a void in a ductwork, comprising:
    an illumination source;
    a securing component that removably attaches the illumination source to an exterior surface of the ductwork; and
    a multi-faceted reflector that selectively redirects light from the illumination source onto a target surface of an interior of the ductwork, wherein the void is detected when a portion of the light exits the ductwork.

2. The system of claim 1, wherein the securing component is configured to secure the system to the exterior surface of the ductwork, such that the reflector is located within an internal portion of the ductwork and at least a portion of the illumination source is located exterior to the ductwork.

3. The system of claim 1, wherein the securing component comprises a magnet.

4. The system of claim 1, further comprising a base configured to accommodate the illumination source.

5. The system of claim 4, wherein the reflector is connected to the base by an adjustable support support.

6. The system of claim 4, wherein the base is integrally formed with the illumination source.

7. The system of claim 1, wherein the reflector is connected to a base that comprises an adjustable coupler, wherein the adjustable coupler is configured to adjust to accommodate illumination sources of various sizes.

8. A leak detection system for detecting a leak in ductwork, comprising:
    a base configured to accommodate a lighting source;
    an adjustable multi-faceted reflector connected to the base, wherein the adjustable multi-faceted reflector is configured to adjust a direction at which light from the lighting source is reflected so as to direct the light onto a target surface of an interior of the ductwork; and
    a securing component configured to secure the leak detection system to an exterior surface of a duct such that the adjustable multi-faceted reflector is located within an internal portion of the ductwork and at least a portion of the light source is located exterior to the ductwork.

9. The leak detection system of claim 8, wherein the securing component comprises a magnet.

10. The leak detection system of claim 8, wherein the adjustable multi-faceted reflector is connected to the base by an adjustable support, wherein the adjustable support is configured to adjust a length of the adjustable support.

11. The leak detection system of claim 8, wherein the base further comprises an adjustable coupler, wherein the adjustable coupler is configured to adjust to accommodate light sources of various sizes.

12. The leak detection system of claim 8, wherein the base is integrally formed with the lighting source.

13. The leak detection system of claim 8, wherein the adjustable multi-faceted reflector is integrally connected to the base.

14. A method of detecting a void in duct system comprising;
    inserting a portion of a leak detection system through an aperture in the duct system, wherein the leak detection system comprises:
        an illumination portion comprising an illumination source; and
        a reflector portion comprising a reflector that selectively redirects light from the illumination source onto a target surface of an interior of the ductwork;
    positioning the leak detection system such that light from the illumination source is reflected by the reflector onto a target surface of an internal portion of the duct system,
    securing a portion of the leak detection system to an external portion of the duct system; and
    detecting the light reflected from reflector outside the duct system, wherein the detection identifies a presence of the void in the duct system.

15. The method of claim 14 wherein the securing further comprises configuring the illumination source to maintain a direction of the light on the target surface.

16. The method of claim 14 wherein the reflector portion is connected to the illumination portion by an adjustable support.

17. The method of claim 14, wherein the inserting comprises inserting the reflector portion through the aperture in the duct system and the securing comprises securing the illumination portion to the external portion of the duct system.

* * * * *